United States Patent
Chen et al.

(10) Patent No.: US 10,488,570 B2
(45) Date of Patent: Nov. 26, 2019

(54) DISPLAY SUBSTRATE AND DISPLAY DEVICE

(71) Applicants: BOE TECHNOLOGY GROUP CO., LTD., Beijing (CN); Chengdu BOE Optoelectronics Technology Co., Ltd., Chengdu, Sichuan Province (CN)

(72) Inventors: Shiqi Chen, Beijing (CN); Ni Jiang, Beijing (CN); Yuanming Feng, Beijing (CN); Xiongcan Zuo, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu (CN)

( * ) Notice: Subject to any disclaimer, the term of this patent is extended or adjusted under 35 U.S.C. 154(b) by 50 days.

(21) Appl. No.: 15/945,195

(22) Filed: Apr. 4, 2018

(65) Prior Publication Data

US 2019/0079229 A1    Mar. 14, 2019

(30) Foreign Application Priority Data

Sep. 13, 2017   (CN) .......................... 2017 1 0822871

(51) Int. Cl.
| | | |
|---|---|---|
| *G02B 5/22* | (2006.01) | |
| *G02B 5/30* | (2006.01) | |
| *G02B 17/08* | (2006.01) | |
| *G02B 5/04* | (2006.01) | |
| *G02F 1/133* | (2006.01) | |

(52) U.S. Cl.
CPC ................. *G02B 5/22* (2013.01); *G02B 5/04* (2013.01); *G02B 5/3025* (2013.01); *G02B 17/0856* (2013.01); *G02F 1/133* (2013.01)

(58) Field of Classification Search
CPC .......... G02B 5/22; G02B 5/04; G02B 5/3025; G02B 17/0856; G02F 1/133
See application file for complete search history.

(56) References Cited

U.S. PATENT DOCUMENTS

2009/0115933 A1*   5/2009   Mimura ............ G02F 1/133512
                                                              349/59

\* cited by examiner

*Primary Examiner* — Wen Huang
(74) *Attorney, Agent, or Firm* — Nath, Goldberg & Meyer; Joshua B. Goldberg

(57) ABSTRACT

The present disclosure provides a display substrate and a display device. The display substrate includes a color filter layer and a shielding layer formed on a base substrate, the display substrate includes a display region and a non-display region, the display region has an anomalous boundary, the shielding layer covers the non-display region, a prism component is provided between the shielding layer and the color filter layer, and the prism component is located at a border of the display region and the non-display region for introducing light emitted from the color filter layer in the non-display region into the display region so that the light emitted from the color filter layer in the non-display region finally emits from the display region.

14 Claims, 2 Drawing Sheets

DISPLAY SUBSTRATE AND DISPLAY DEVICE

CROSS REFERENCE FOR RELATED APPLICATION

The present disclosure claims priority to Chinese patent application No. 201710822871.5 filed on Sep. 13, 2017, entitled "DISPLAY SUBSTRATE AND DISPLAY DEVICE", the disclosure of which is hereby incorporated by reference in its entirety.

FIELD

The present disclosure relates to the field of display technology, and in particular to a display substrate and a display device.

BACKGROUND

In view of aesthetics, ergonomics etc., popular smart wearable products mostly adopt a circular design, for example, smart watches, smart glasses, smart necklaces or the like adopt the circular design, and a display region thereof is correspondingly designed to be circular. However, manufacturing technologies of a display screen are mostly directed to a common rectangular display region, basic display units (i.e., pixels) of a rectangular display screen are rectangular or square. In a case where such manufacturing technologies are employed to manufacture a non-rectangular display screen (e.g., a circular display screen), pixels at an edge of the display screen cannot completely fit the edge of the display screen, which causes a serrated display at the edge of the display screen, although an appearance of a circular display screen is circular. In this case, if a shielding layer at periphery of an effective display region is designed to be circular, a significant color shift phenomenon will occur.

SUMMARY

As an aspect, the present disclosure provides a display substrate including a color filter layer and a shielding layer formed on a base substrate, the display substrate includes a display region and a non-display region, the display region has an anomalous boundary, the shielding layer covers the non-display region, a prism component is provided between the shielding layer and the color filter layer, and the prism component is located at a border of the display region and the non-display region for introducing light emitted from the color filter layer in the non-display region into the display region so that the light emitted from the color filter layer in the non-display region finally emits from the display region.

In some implementations, the prism component includes a first prism located in the non-display region at the border and a second prism located in the display region at the border, the first prism is configured to reflect the light emitted from the color filter layer in the non-display region to the second prism, and the second prism is configured to receive and reflect the light reflected by the first prism so that the light finally emits from the display region.

In some implementations, each of the first prism and the second prism has a reflective surface, and the reflective surfaces of the first prism and the second prism are parallel and face to each other.

In some implementations, a reflective surface of the first prism is a totally reflective surface, and is configured to totally reflect the light emitted from the color filter layer in the non-display region to the second prism.

In some implementations, a reflective surface of the second prism is a semi-reflective surface, is configured to reflect the light reflected by the first prism so that the light finally emits from the display region, and to allow light emitted from the color filter layer in the display region to transmit therethrough so that the light emitted from the color filter layer in the display region finally emits from the display region.

In some implementations, the display substrate further includes a polarization conversion component, which is provided between the prism component and the color filter layer and is configured to convert the light emitted from the color filter layer in the non-display region into a polarized light which is incident to the first prism.

In some implementations, the reflective surface of the first prism is formed by coating a polarized light reflective layer, and is configured to totally reflect the polarized light emitted from the polarization conversion component to the second prism.

In some implementations, the reflective surface of the second prism is formed by coating a polarized light reflective layer, and is configured to reflect the polarized light reflected by the first prism so that the polarized light finally emits from the display region.

In some implementations, a boundary of an orthographic projection of the reflective surface of the first prism on the color filter layer and a boundary of an orthographic projection of the shielding layer on the color filter layer coincide with the boundary of the display region.

In some implementations, the orthographic projection of the reflective surface of the first prism on the color filter layer covers the color filter layer in the non-display region.

In some implementations, the orthographic projection of the reflective surface of the second prism on the color filter layer covers a portion of the display region.

In some implementations, vertical heights of the first prism and the second prism between the color filter layer and the shielding layer are the same with each other.

In some implementations, an orthographic projection of the prism component on the color filter layer covers one or more pixels of the color filter layer.

As another aspect, the present disclosure provides a display device including the display substrate described above.

DETAILED DESCRIPTION OF THE EMBODIMENTS

To make features and advantages of the present disclosure more clear and easy to be understood, the present disclosure will be described in detail below in conjunction with drawings and specific embodiments.

Figure 1:
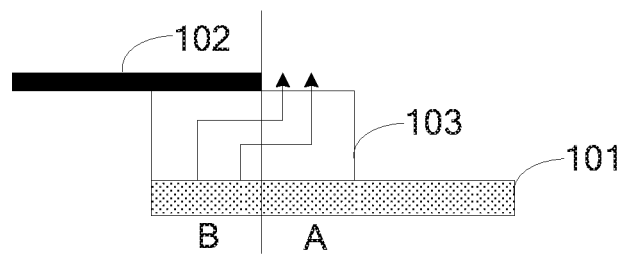
FIG. 1 shows a structural diagram of a display substrate in accordance with an embodiment of the present disclosure.

FIG. 1 shows a display substrate in accordance with an embodiment of the present disclosure. As show in FIG. 1, the display substrate includes a color filter layer 101 and a shielding layer 102 formed on a base substrate, the display substrate includes a display region A and an non-display region B, the display region A has an anomalous boundary, the shielding layer 102 covers the non-display region B, a prism component 103 is provided between the shielding layer 102 and the color filter layer 101, and the prism component 103 is located at a border of the display region A and the non-display region B for introducing light emitted from the color filter layer 101 in the non-display region B into the display region A so that the light emitted from the color filter layer 101 in the non-display region B finally emits from the display region A.

In the embodiment, the display substrate includes the display region A and the non-display region B, the display region A has the anomalous boundary, the non-display region B is covered by the shielding layer 102, the display region A is not covered by the shielding layer 102, and the display region A has a smooth display boundary, avoiding the serrated display at the edge of the display region A caused by the color filter layer 101 consisting of rectangular pixels. The display region A having the anomalous boundary means that the display region A has a shape not being a regular rectangle, instead, the shape of the display region A has an edge extending along a direction different from a transverse arrangement direction or a longitudinal arrangement direction of the pixels. For example, the display region A may be circular, oval, rounded corner rectangular etc., which is not limited by the embodiment. The shape of the display region A can be set according to actual situations.

Since the non-display region B is covered by the shielding layer 102, if the prism component 103 is not provided, the light emitted from the color filter layer 101 in the non-display region B would be shielded by the shielding layer 102, which results in color cast during display. If the prism component 103 is provided between the shielding layer 102 and the color filter layer 101, the light emitted from the color filter layer 101 in the non-display region B is incident to the prism component 103, the prism component 103 introduces the light into the display region A so that the light emitted from the color filter layer 101 in the non-display region B finally emits from the display region A. Thus, the prism component 103 solves a problem that the light emitted from the color filter layer 101 in the non-display region B is shielded by the shielding layer 102, thereby solves a problem of color cast caused by a fact that the light emitted from the color filter layer 101 in the non-display region B is shielded by the shielding layer 102. The prism component 103 may be made of optical fiber or other materials, which is not limited by the embodiment, and the material of the prism component 103 can be selected according to actual situations.

As above, in the embodiment, the display substrate includes the color filter layer and the shielding layer formed on the base substrate, the display substrate includes the display region and the non-display region, the display region has the anomalous boundary, the shielding layer covers the non-display region, the prism component is provided between the shielding layer and the color filter layer, and the prism component is located at the border of the display region and the non-display region for introducing the light emitted from the color filter layer in the non-display region into the display region so that the light emitted from the color filter layer in the non-display region finally emits from the display region, which avoids the light emitted from the color filter layer in the non-display region being shielded by the shielding layer, solves a problem of serrated display at the edge of the display region caused by the color filter layer consisting of rectangular pixels. Moreover, since the light emitted from the color filter layer in the non-display region is introduced into the display region by the prism component and finally emits from the display region, the problem of color cast caused by the fact that the light emitted from the color filter layer in the non-display region is shielded by the shielding layer is solved.

Figure 2:
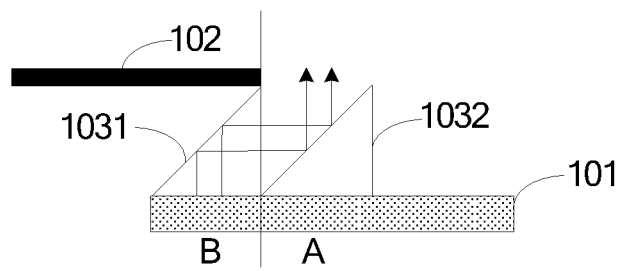
FIG. 2 shows a structural diagram of a prism component in a display structure in accordance with an embodiment of the present disclosure.

In some implementations, as shown in FIG. 2, the prism component 103 includes a first prism 1031 located in the non-display region B at the border and a second prism 1032 located in the display region A at the border, the first prism 1031 is configured to reflect the light emitted from the color filter layer 101 in the non-display region B to the second prism 1032, and the second prism 1032 is configured to receive and reflect the light reflected by the first prism 1031 so that the light finally emits from the display region A.

Specifically, as shown in FIG. 2, the light emitted from the color filter layer 101 in the non-display region B is incident to the first prism 1031 and is reflected by the first prism 1031 to the second prism 1032, the second prism 1032 receives and reflects the light so that the light emitted from the color filter layer 101 in the non-display region B finally emits from the display region A.

In some implementations, as shown in FIG. 2, each of the first prism 1031 and the second prism 1032 has a reflective surface, and the reflective surfaces of the first prism 1031 and the second prism 1032 are parallel and face to each other. For example, each of the first prism 1031 and the second prism 1032 has a right-angled triangular cross section perpendicular to a display surface and along a direction normal to the boundary of the display region A, and hypotenuses of right-angled triangles are parallel to each other, surfaces in which the hypotenuses of the right-angled triangles are located are reflective surfaces face to each other.

In some implementations, the reflective surface of the first prism 1031 is a totally reflective surface, and is configured to totally reflect the light emitted from the color filter layer 101 in the non-display region B to the second prism 1032.

In the embodiment, the reflective surface of the first prism 1031 can be adjusted so that the light emitted from the color filter layer 101 in the non-display region 13 is totally reflected to the second prism 1032, and the reflective surface of the second prism 1032 can be adjusted so that the light reflected by the first prism 1031 is received and reflected by the second prism 1032 to finally emit from the display region A. For example, the reflective surface of the first prism 1031 and the reflective surface of the second prism 1032 may be formed by coating a reflective material, which is not limited by the embodiment. A method for forming the reflective surface of the first prism 1031 and the reflective surface of the second prism 1032 can be selected according to actual situations.

Figure 3:
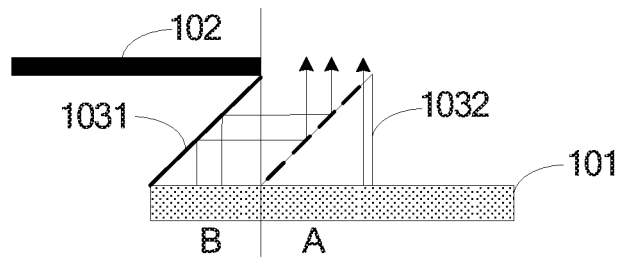
FIG. 3 shows another structural diagram of a prism component in a display structure in accordance with an embodiment of the present disclosure.

In some implementations, as shown in FIG. 3, the reflective surface of the second prism 1032 is a semi-reflective surface, is configured to reflect the light reflected by the first prism 1031 so that the light finally emits from the display region A, and to allow light emitted from the color filter layer 101 in the display region A to transmit therethrough so that the light emitted from the color filter layer 101 in the display region A finally emits from the display region A.

In some implementations, a semi-reflective material may be coated on a surface of the second prism 1032 for forming the reflective surface to form the semi-reflective surface of the second prism 1032, the semi-reflective surface of the second prism 1032 totally reflects the light reflected by the first prism 1031 and allows the light emitted from the color filter layer 101 in the display region A to transmit therethrough. Since the second prism 1032 reflects the light reflected by the first prism 1031 so that the light finally emits from the display region A, and allows the light emitted from the color filter layer 101 in the display region A to transmit therethrough so that the light emits from the display region A, the display at the boundary of the display region A includes a mixture display of reflected light and transmitted light or respective displays of reflected light and transmitted light, which solves the problem of color cast caused by the fact that the light emitted from the color filter layer 101 in the non-display region B is shielded by the shielding layer 102.

Figure 4:
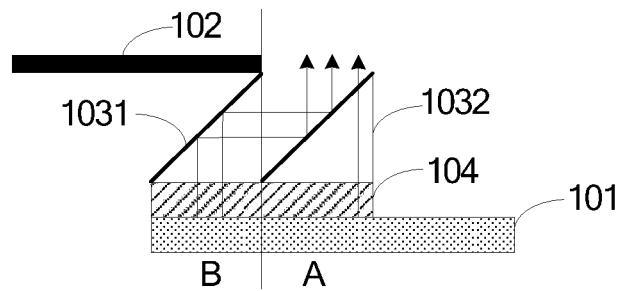
FIG. 4 shows another structural diagram of a display substrate in accordance with an embodiment of the present disclosure.

In some implementations, as shown in FIG. 4, the display substrate further includes a polarization conversion component 104, which is provided between the prism component 103 and the color filter layer 101 and is configured to convert the light emitted from the color filter layer 101 in the non-display region B into a polarized light which is incident to the first prism 1031.

In some implementations, the polarization conversion component 104 includes two transparent substrates with transparent material and/or optical rotation material filled between them. The transparent material may be transparent resin, the optical rotation material may be liquid crystal, which is not limited by the embodiment, and a selection can be made according to actual situations. When the light enters the polarization conversion component 104, in a case where the light enters the optical rotation material, the light would be converted into polarized light, and in a case where the light enters the transparent material, the light would directly transmit through the polarization conversion component 104.

Specifically, the polarization conversion component 104 is provided between the prism component 103 and the color filter layer 101, the light emitted from the color filter layer 101 in the non-display region 13 enters the polarization conversion component 104, is converted into polarized light by the polarization conversion component 104, and then is incident to the first prism 1031.

In some implementations, the reflective surface of the first prism 1031 is formed by coating a polarized light reflective layer, and is configured to totally reflect the polarized light emitted from the polarization conversion component 104 to the second prism 1032, the material of the polarized light reflective layer is not limited by the embodiment, and can be selected according to actual situations.

In some implementations, the reflective surface of the second prism 1032 is formed by coating a polarized light reflective layer, and is configured to reflect the polarized light reflected by the first prism 1031 so that the polarized light emits from the display region A.

Specifically, the second prism 1032 receives and totally reflects the polarized light reflected by the first prism 1031 at the reflective surface of the second prism 1032 so that the polarized light emits from the display region A.

Figure 5:
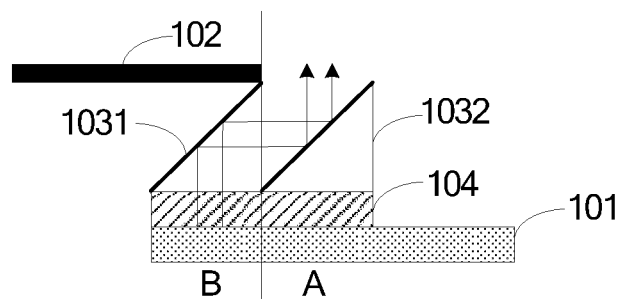
FIG. 5 shows still another structural diagram of a display substrate in accordance with an embodiment of the present disclosure.
Figure 5:
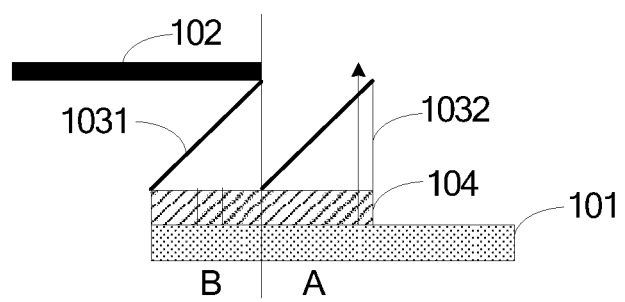

A portion of the polarization conversion component 104 provided between the second prism 1032 and the color filter layer 101 may be formed of transparent material or optical rotation material. In a case where the portion of the polarization conversion component 104 provided between the second prism 1032 and the color filter layer 101 is formed of transparent material, as shown in FIG. 4, the second prism 1032 reflects the light reflected by the first prism 1031 so that the light finally emits from the display region A, and allows the light emitted from the color filter layer 101 in the display region A to transmit therethrough so that the light emitted from the color filter layer 101 in the display region A emits from the display region A. In a case where the portion of the polarization conversion component 104 provided between the second prism 1032 and the color filter layer 101 is formed of optical rotation material, the polarization conversion component 104 is alternately switched between two states as shown in FIG. 5. When the polarization conversion component 104 is in a polarization conversion state as shown in the upper part of FIG. 5, the polarization conversion component 104 converts the light emitted from the color filter layer 101 into polarized light, the polarized light emitted from the non-display region B is reflected by the first prism 1031 and the second prism 1032 and finally emits from the display region A, and in this case, the light emitted from the color filter layer 101 in the display region A cannot transmit through the second prism 1032. When the polarization conversion component 104 is in a transparent state as shown in the lower part of FIG. 5, the light emitted from the color filter layer 101 in the non-display region B passes through the polarization conversion component 104 and is incident to the first prism 1031, but the first prism 1031 cannot reflect the light, thus the light emitted from the color filter layer 101 in the non-display region B cannot emit from the display region A, and in this case, the light emitted from the color filter layer 101 in the display region A is incident to the second prism 1032 and transmits through the second prism 1032 to emit from the display region A. How to switch states of the polarization conversion component is not limited by the embodiment, and can be set according to actual situations.

In some implementations, a boundary of an orthographic projection of the reflective surface of the first prism 1031 on the color filter layer 101 and a boundary of an orthographic projection of the shielding layer 102 on the color filter layer 101 coincide with the boundary of the display region A.

In some implementations, the orthographic projection of the reflective surface of the first prism 1031 on the color filter layer 101 covers the color filter layer 101 in the non-display region B.

The orthographic projection of the reflective surface of the first prism 1031 on the color filter layer 101 covering the color filter layer 101 in the non-display region B is to avoid the problem of color cast caused by the fact that the light emitted from the color filter layer 101 in the non-display region B cannot finally emit from the display region A.

In some implementations, an orthographic projection of the reflective surface of the second prism 1032 on the color filter layer 101 covers a portion of the display region A.

In some implementations, a positioning angle of the reflective surface of the first prism 1031 is determined according to the shape of the reflective surface of the first prism 1031, and a positioning angle of the reflective surface of the second prism 1032 is determined according to the shape of the reflective surface of the second prism 1032.

In some implementations, vertical heights of the reflective surfaces of the first prism 1031 and the second prism 1032 between the color filter layer 101 and the shielding layer 102 are the same with each other.

The vertical heights of the reflective surfaces of the first prism 1031 and the second prism 1032 between the color filter layer 101 and the shielding layer 102 being the same with each other is to ensure that the second prism 1032 can totally reflect the light reflected by the first prism 1031 so that the light finally emits from the display region A, and to make vertical heights of the first prism 1031 and the second prism 1032 between the color filter layer 101 and the shielding layer 102 being the same with each other, which facilitates manufacturing of the display substrate.

In some implementations, the orthographic projection of the second prism 1032 on the color filter layer 101 covers pixels of the color filter layer 101 as few as possible.

In some implementations, an orthographic projection of the prism component 103 on the color filter layer 101 covers one or more pixels of the color filter layer 101.

In the embodiment, each pixel may include several sub-pixels, such as RGB or RGBW, which is not limited by the embodiment, and can be set according to actual situations.

As above, the display substrate of the embodiment includes the color filter layer and the shielding layer formed on the base substrate, the display substrate includes the display region and the non-display region, the display region has the anomalous boundary, the non-display region is covered by the shielding layer, the prism component is provided between the shielding layer and the color filter layer, and the prism component is located at the border of the display region and the non-display region for introducing light emitted from the color filter layer in the non-display region into the display region so that the light emitted from the color filter layer in the non-display region finally emits from the display region. The display substrate of the embodiment avoids the light emitted from the color filter layer in the non-display region being shielded by the shielding layer, solves the problem of serrated display at the edge of the display region, and moreover, since the light emitted from the color filter layer in the non-display region is introduced into the display region by the prism component and finally emits from the display region, the problem of color cast caused by the fact that the light emitted from the color filter layer in the non-display region is shielded by the shielding layer is solved.

The embodiment further provides a display device including the display substrate of the above embodiment. The display substrate includes the color filter layer and the shielding layer formed on the base substrate, the display substrate includes the display region and the non-display region, the display region has the anomalous boundary, the non-display region is covered by the shielding layer, the prism component is provided between the shielding layer and the color filter layer, and the prism component is located at the border of the display region and the non-display region for introducing light emitted from the color filter layer in the non-display region into the display region so that the light emitted from the color filter layer in the non-display region finally emits from the display region.

Thus, in the embodiment, the display device includes the display substrate, the display substrate includes the color filter layer and the shielding layer formed on the base substrate, the display substrate includes the display region and the non-display region, the display region has the anomalous boundary, the non-display region is covered by the shielding layer, the prism component is provided between the shielding layer and the color filter layer, and the prism component is located at the border of the display region and the non-display region for introducing light emitted from the color filter layer in the non-display region into the display region so that the light emitted from the color filter layer in the non-display region finally emits from the display region. The display substrate of the embodiment avoids the light emitted from the color filter layer in the non-display region being shielded by the shielding layer, solves the problem of serrated display at the edge of the display region, and moreover, since the light emitted from the color filter layer in the non-display region is introduced into the display region by the prism component and finally emits from the display region, the problem of color cast caused by the fact that the light emitted from the color filter layer in the non-display region is shielded by the shielding layer is solved.

It should be noted that, features disclosed by the present disclosure can be combined arbitrarily.

It should be further noted that, in the present disclosure, terms such as "first", "second" are only used for distinguishing an entity or operation from another entity or operation, and are not used for implying a relationship or sequence of these entities or operations. Moreover, terms of "include", "comprise" and variants thereof indicate non-excludability of the subject, thus a procedure, method, product, device or the like including a series of elements not only includes the clearly listed elements but also can include other elements which are not clearly listed, or further includes some inherent elements. Without more limitations, the element defined by words of "including . . . " or "comprising . . . " does not exclude another element existing in the procedure, method, product, device or the like including the element.

The display substrate and the display device provided by the present disclosure are described in detail as above, embodiments are only used for illustrating the principle and implementations of the present disclosure and facilitating comprehension of the present disclosure and concepts thereof, and are not limitations to the present disclosure, various modifications and improvements made bar those ordinary skilled in the art for implementations and application scopes of embodiments of the present disclosure within concepts of the present disclosure fall into the protection scope of the present disclosure.

The invention claimed is:

1. A display substrate, comprising a color filter layer and a shielding layer formed on a base substrate, the display substrate comprises a display region and a non-display region, the display region has an anomalous boundary, the shielding layer covers the non-display region,
   wherein a prism component is provided between the shielding layer and the color filter layer, and the prism component is located at a border of the display region and the non-display region for introducing light emitted from the color filter layer in the non-display region into the display region so that the light emitted from the color filter layer in the non-display region finally emits from the display region.

2. The display substrate of claim 1, wherein the prism component comprises a first prism located in the non-display region at the border and a second prism located in the display region at the border,
   the first prism is configured to reflect the light emitted from the color filter layer in the non-display region to the second prism, and
   the second prism is configured to receive and reflect the light reflected by the first prism so that the light finally emits from the display region.

3. The display substrate of claim 2, wherein each of the first prism and the second prism has a reflective surface, and the reflective surfaces of the first prism and the second prism are parallel and face to each other.

4. The display substrate of claim 2, wherein a reflective surface of the first prism is a totally reflective surface, and is configured to totally reflect the light emitted from the color filter layer in the non-display region to the second prism.

5. The display substrate of claim 2, wherein a reflective surface of the second prism is a semi-reflective surface, is configured to reflect the light reflected by the first prism so that the light finally emits from the display region, and to allow light emitted from the color filter layer in the display region to transmit therethrough so that the light emitted from the color filter layer in the display region finally emits from the display region.

6. The display substrate of claim 2, further comprising a polarization conversion component, which is provided between the prism component and the color filter layer and is configured to convert the light emitted from the color filter layer in the non-display region into a polarized light which is incident to the first prism.

7. The display substrate of claim 6, wherein the reflective surface of the first prism is formed by coating a polarized light reflective layer, and is configured to totally reflect the polarized light emitted from the polarization conversion component to the second prism.

8. The display substrate of claim 6, wherein the reflective surface of the second prism is formed by coating a polarized light reflective layer, and is configured to reflect the polarized light reflected by the first prism so that the light finally emits from the display region.

9. The display substrate of claim 2, wherein a boundary of an orthographic projection of the reflective surface of the first prism on the color filter layer and a boundary of an orthographic projection of the shielding layer on the color filter layer coincide with the boundary of the display region.

10. The display substrate of claim 2, wherein an orthographic projection of the reflective surface of the first prism on the color filter layer covers the color filter layer in the non-display region.

11. The display substrate of claim 2, wherein an orthographic projection of the reflective surface of the second prism on the color filter layer covers a portion of the display region.

12. The display substrate of claim 2, wherein vertical heights of the first prism and the second prism between the color filter layer and the shielding layer are the same with each other.

13. The display substrate of claim 1, wherein an orthographic projection of the prism component on the color filter layer covers one or more pixels of the color filter layer.

14. A display device, comprising the display substrate of claim 1.

* * * * *